United States Patent
Rouge et al.

(10) Patent No.: US 6,493,021 B1
(45) Date of Patent: Dec. 10, 2002

(54) IMAGE ACQUISITION BY PUSH-BROOM SCANNING

(75) Inventors: Bernard Rouge, Toulouse; Jean-Michel Morel, Paris, both of (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/424,268

(22) PCT Filed: Mar. 18, 1999

(86) PCT No.: PCT/FR99/00622

§ 371 (c)(1),
(2), (4) Date: Jan. 31, 2000

(87) PCT Pub. No.: WO99/49651

PCT Pub. Date: Sep. 30, 1999

(30) Foreign Application Priority Data

Mar. 20, 1998 (FR) .............................................. 98 03450

(51) Int. Cl.⁷ .................................................. H04N 7/18
(52) U.S. Cl. ....................................... 348/145; 348/202
(58) Field of Search ................................ 348/144, 145, 348/202; 358/494; H04N 7/18

(56) References Cited

U.S. PATENT DOCUMENTS 6,215,522 B1 * 4/2001 Rouge et al. ................ 348/145

FOREIGN PATENT DOCUMENTS

| EP | 0 010 926 A1 | 5/1980 |
| FR | 2 678 460 | 12/1992 |
| FR | 2 737 375 | 1/1997 |
| GB | 2 191 058 A | 12/1987 |
| WO | WO 97/05451 | 2/1997 |

* cited by examiner

Primary Examiner—Young Lee
(74) Attorney, Agent, or Firm—Morgan & Finnegan LLP

(57) ABSTRACT

An improvement to a method of acquiring and processing a satellite observation image of the earth through the use of one strip or a matrix of charge coupled device type detectors. As the detectors travel over an observed zone, a plurality of pixels are acquired in a sampling method. The sampling method includes "e" subarrays corresponding to sampling thereby satisfying Shannon's condition. The "e" is an integer or rational number greater that 1. Processing is implemented that enables a noise-reduced image to be interpolated at a resolution corresponding to that of a sampling subarray on the basis of initially acquired image pixels.

8 Claims, 4 Drawing Sheets

P = PITCH BETWEEN TWO ELEMENTARY DETECTORS OF THE STRIPS
D = DIRECTION OF SATELLITE TRAVEL

D = DIRECTION OF SATELLITE TRAVEL
$L_1, L_2, \ldots L_n$ = SUCCESSIVE LINES OF A LANDSCAPE P = PITCH BETWEEN TWO ELEMENTARY
    DETECTORS OF STRIP 11
D = DIRECTION OF SATELLITE TRAVEL P = PITCH BETWEEN TWO ELEMENTARY DETECTORS OF THE STRIPS
D = DIRECTION OF SATELLITE TRAVEL

FIG. 6
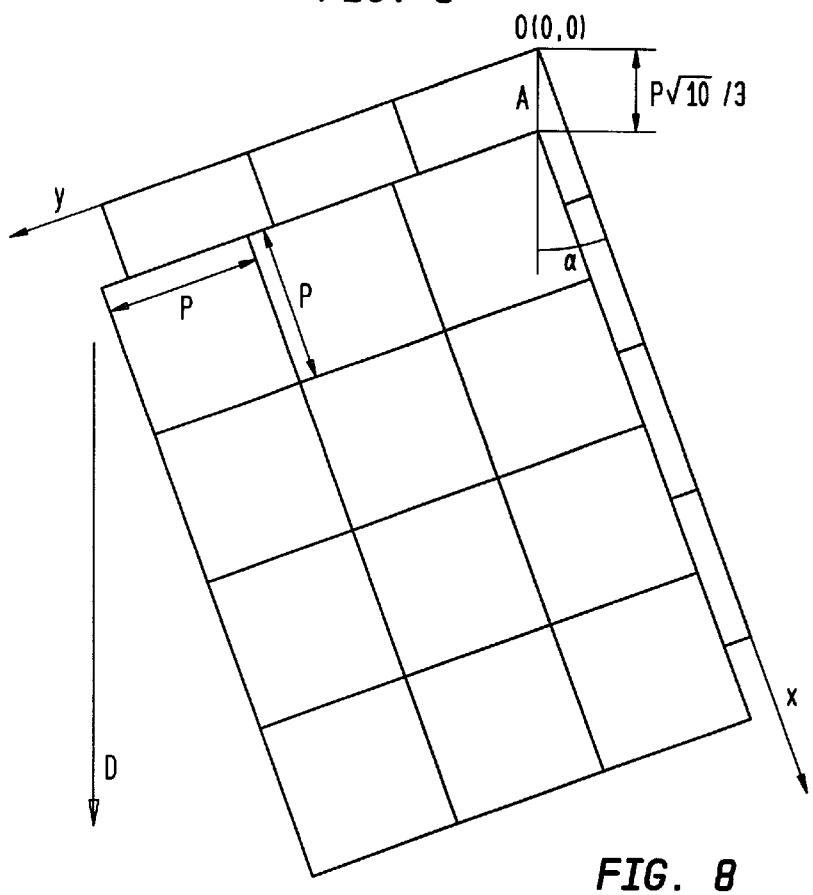
FIG. 7
A ROW OF A PLURALITY OF PARALLEL STRIPS
OF CHARGE-COUPLED DEVICE TYPE DETECTORS
FIG. 8
A PLURALITY OF SUPERIMPOSED
ROWS OF PARALLEL STRIPS AS IN FIG. 7
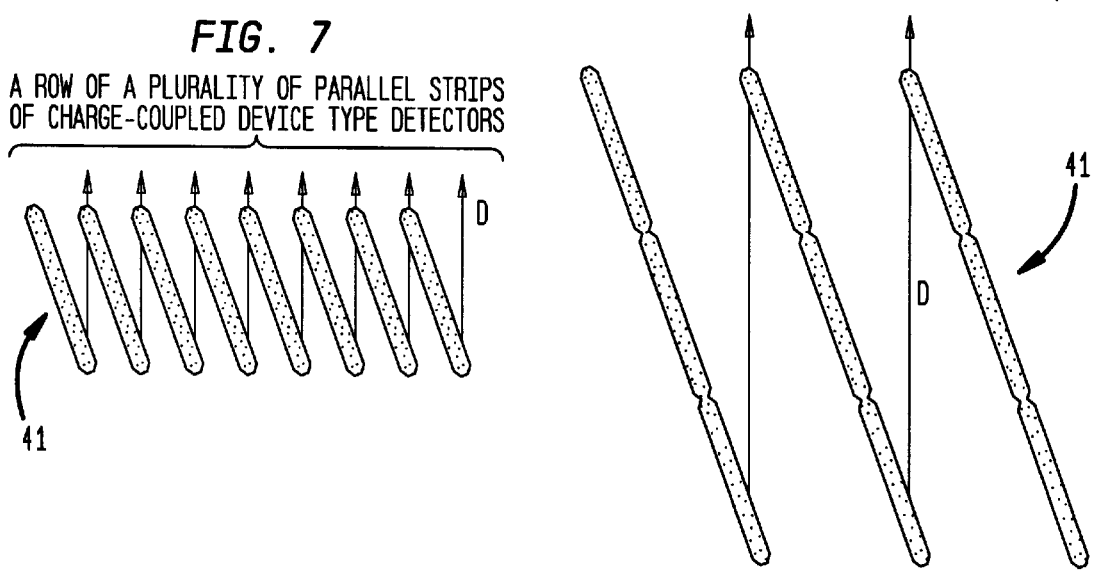

IMAGE ACQUISITION BY PUSH-BROOM SCANNING

The present invention relates to acquiring a satellite observation image of the earth by push-broom scanning using one or more strips (or matrix(ces)) of detectors of the charge coupled device (CCD) type travelling relative to the observed zone.

FIELD OF THE INVENTION

The principle of push-broom type scanning is shown in FIG. 1 for the case of a single strip 1 of detectors.

As the satellite carrying the strip 1 travels, the strip observes successive lines $L_1, L_2, \ldots, L_n$ perpendicular to the travel direction (arrow D). At each instant, an optical system 2 of the instrumentation forms the image of a line of landscape on the line of detectors, with the strip 1 being placed in the focal plane of the optical system 2, perpendicularly to the speed vector of the satellite. The landscape scans over each detector which integrates light flux over an exposure time and transforms it into a proportional electric charge.

FIG. 2 shows a conventional system for processing images taken in this way.

That processing system comprises, in outline: a unit 3 for processing and amplifying the output from the detectors of the strip 1; an analog-to-digital encoder 4 that receives the signal output by the unit 3; transmitter means 5 for taking the digital images picked up in this way and transmitting them from the satellite to the ground; and a unit 6 on the ground for reconstituting the images.

The unit 3 includes, in particular, a shift register into which the information as integrated and stored in charge form in each detector of the strip 1 is transferred at the end of an exposure time. Thereafter, the register transfers the charges in the form of electrons, and the charges are converted into a succession of voltages that are proportional to the received and integrated light fluxes.

The unit 6 on the ground reconstructs the images, in particular by implementing deconvolution processing to compensate for instrument defects, and where appropriate interpolation processing to reconstitute certain pixels within the image.

STATE OF THE ART AND OBJECT OF THE INVENTION

It is known that the finer the resolution of an image, the more the signal-to-noise (SNR) tends to diminish, in particular because of the lack of light flux, so that images cease to be acceptable.

Unfortunately, presently known solutions for mitigating that drawback are not satisfactory.

In particular, one possible solution consists in increasing the dimensions of the instrument, and in particular the diameter of the pupil of the telescope. However that solution is expensive.

Another solution consists in controlling the attitude of the satellite so as to slow down its rate of scanning. That technique allows light flux to be integrated for longer, but it implies a loss of continuity in the track of the satellite, and consequently leads to a loss of data.

A third solution consists in using special time delay integration (TDI) detectors. These detectors are constituted as matrices in which the rows are shifted electronically so as to compensate for the speed of the satellite. Nevertheless, such a system is complex to embody and implement. Furthermore, it does not enable sampling to be performed that is adapted to the modulation transfer function so as to ensure that spectrum folding is negligible and acquisition data rate is optimized.

An object of the invention is thus to provide an acquisition method of this type in which instrument noise is reduced and which does not suffer from the drawbacks of the above-mentioned solutions.

Theoretical Background

It is known that image acquisition by push-broom scanning can be modelled linearly by the formulation:

$$I_b = \Pi_p(h \otimes \bigcirc + b)$$

where:

$\otimes$ designates the convolution operation;

$\bigcirc$ is the landscape whose image is to be acquired;

$h$ is the impulse response of the instrument;

$b$ is the noise superposed on the filtered landscape;

$I_b$ bis the raw image; and $\Pi_p$ is a two-dimensional Dirac comb which means that the continuous image has been made discrete.

The image is digital and encoded on a limited number of bits.

A spectral representation is often preferred. It is represented by the Fourier transform (FT) of the raw image, i.e.:

$$\hat{I}_b = \Pi_p \otimes (MTF.\hat{O} + b)$$

where the hats indicate that these are Fourier transforms, and where the abbreviation MTF stands for modulation transfer function, which is the Fourier transform of the impulse response. In the spectral representation, the convolution operation is equivalent to a multiplicative operation.

The parameters that are mainly involved in the above equations are described in greater detail below.

Modulation Transfer Function or MTF

The MTF is the attenuation factor of spatial frequencies. The higher the frequency the lower the MTF. The geometrical location where the MTF becomes zero is the boundary of the instrumental cutoff. The instrument spectral medium is the low frequency domain as limited by the instrumental cutoff boundary.

The MTF of an instrument is the product of the MTF of its optical system multiplied by the MTF of its detector and by the MTF of its displacement in the travel direction.

Noise

Instrumental noise is always present. A simplified approach consists in considering that it is characterized by the mean SNR (generally known once the mission of the satellite has been defined), and that, compared with other noise, Poisson type photon noise is preponderant at the mean luminance. With such a distribution, the standard deviation of the noise varies with the square root of the number of photons N picked up by the detector. Consequently:

$$SNR = \sqrt{N}$$

Sampling Array

Present satellites generate a square orthogonal array (speed and strip are in orthogonal directions). The sampling step size in the speed direction on the ground is $\Delta\tau = v.t_e$ (where $v$ is the speed of the satellite and $t_e$ is the sampling time), and the sampling step size in the strip direction is equal to the distance between two adjacent elementary CCDs. Consequently, using the arrays implemented in present satellites, the two pitches are equal and the projections of ground pixels do not overlap (the ground is scanned once only).

However, with acquisition as performed by current satellites, the sampling frequency is equal to the cutoff frequency so Shannon's condition is not satisfied ($t_e < \frac{1}{2}f_c$, where $f_c$ is the cutoff frequency). This results in a high level of spectrum folding that gives rise to artifacts and makes any attempt at deconvolution or interpolation difficult.

To mitigate that drawback, proposals have recently been made, in particular in French patent FR 2 678 460 in the name of the Applicant, to use a technique whereby two offset strips make it possible to perform oversampling so as to limit spectrum folding.

In its patent application WO 97/05451, the Applicant has also proposed techniques for implementing staggered oversampling adapted to the modulation transfer function of the instrument so as to enable the amount of spectrum folding to be negligible while nevertheless optimizing acquisition data rate.

SUMMARY OF THE INVENTION

The invention proposes an instrumental solution which makes it possible to obtain images in which firstly spectrum folding is limited and secondly noise is minimized.

More particularly, the invention provides a method of acquiring and processing a satellite observation image of the earth by means of at least one strip or matrix of detectors of the charge coupled device type, said detectors travelling over the observed zone, in which a plurality of pixels are acquired in a given sampling, the method being characterized in that that array of said sampling includes "e" subarrays corresponding to sampling satisfying Shannon's condition, where "e" is an integer or rational number greater than 1, and in that processing is implemented that enables a noise-reduced image to be interpolated at a resolution corresponding to that of a sampling subarray on the basis of the initially acquired image pixels.

In other words, the initial image is equivalent to "ee" images corresponding to sampling that satisfies Shannon's condition, with which a new image at the same resolution is reconstituted. For each pixel of the new image, "e" times more flux is available than in the case of normal acquisition, such that the mean noise in the new image is divided by $\sqrt{e}$ compared with the noise normally obtained for an image of the same resolution.

The invention also provides a camera instrument for implementing the method.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 6 shows a possible embodiment of the invention using a matrix of detectors; and FIGS. 7 and 8 show two ways in which strips can be organized so that they can be used for increasing field when the invention is implemented using a plurality of detector strips.

DESCRIPTION OF PARTICULAR EMBODIMENTS

Figure 1:
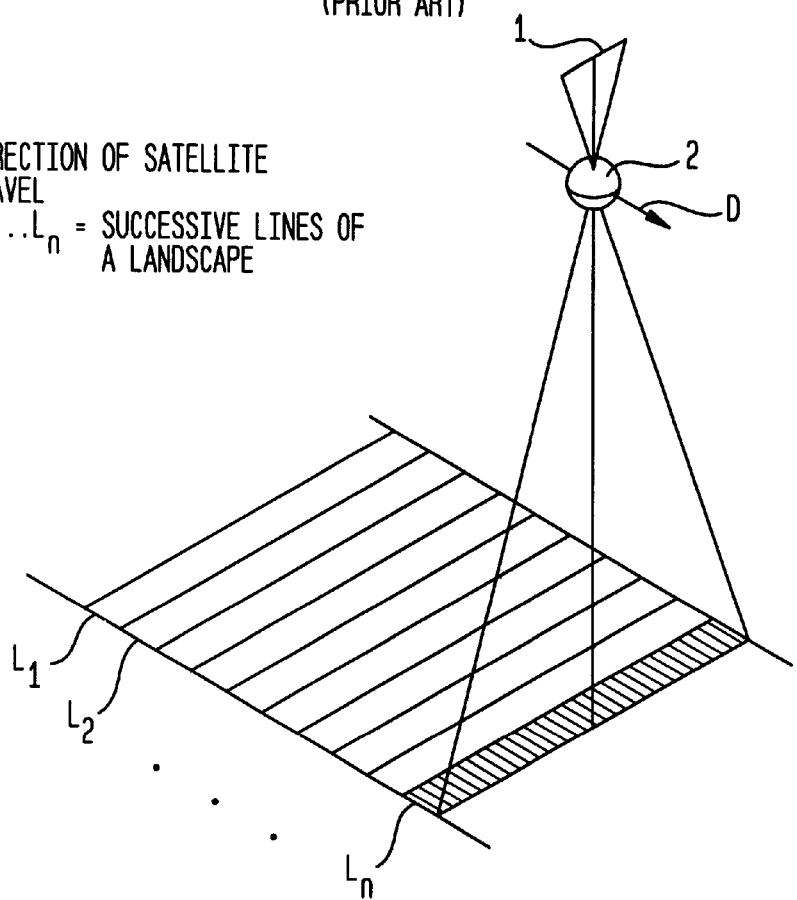
FIG. 1, described above, shows the principle of acquisition by push-broom scanning.
Figure 2:
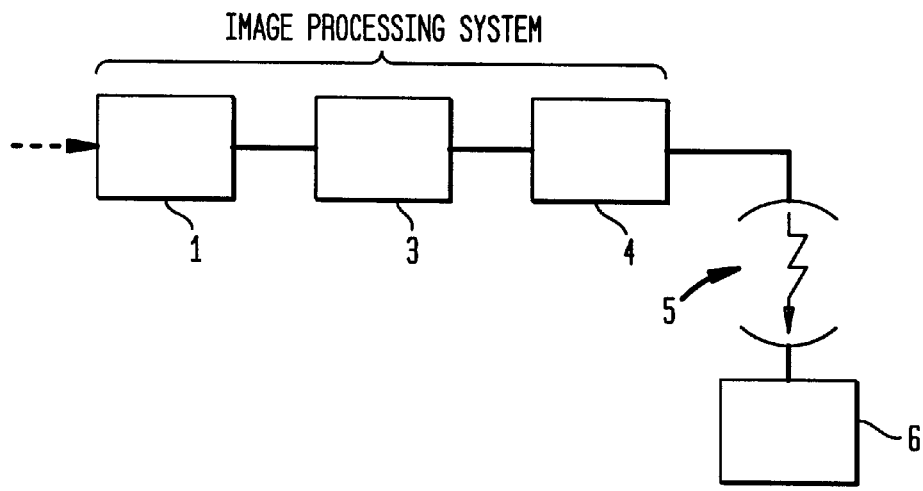
FIG. 2, also described above, shows a system for processing images picked up by push-broom scanning.
Figure 3:
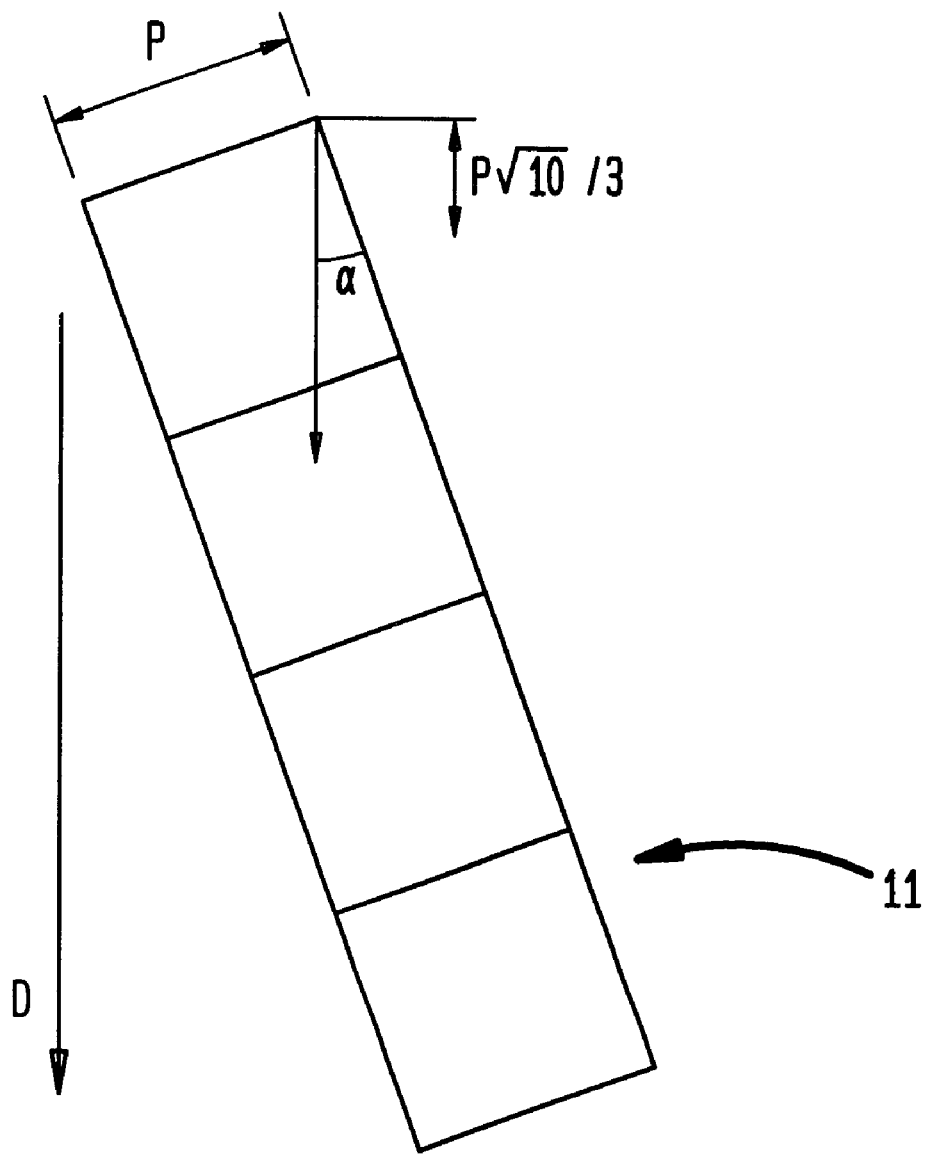
FIGS. 3 and 4 are diagrams showing one possible implementation of the invention using a single strip of detectors.
Figure 4:
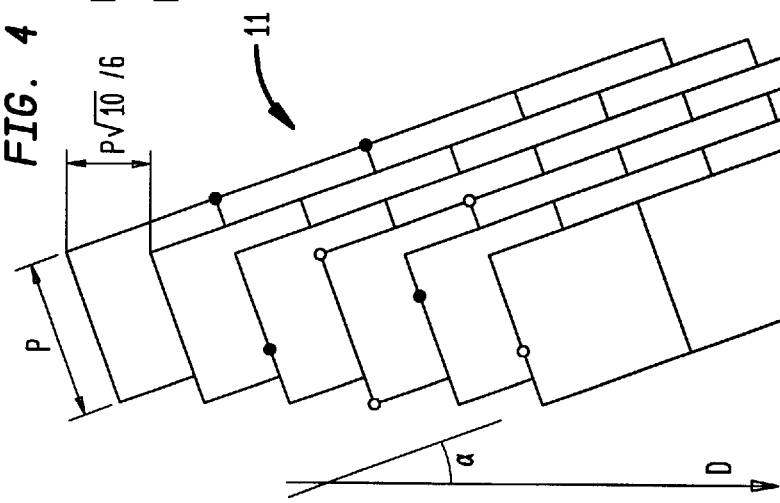

FIGS. 3 and 4 show a linear strip 11 placed in the focal plane of a satellite observation instrument, and also the projection in said focal plane of the travel direction D of the satellite carrying the strip 11.

The strip 11 is oriented in said focal plane so as to form an angle $\alpha$ relative to the direction D where $\alpha$ is equal to arctan($\frac{1}{3}$).

The sampling pitch $\Delta\tau$ in the travel direction D is equal to $p\sqrt{10}/6$, where $\underline{p}$ is the pitch between two elementary detectors of the strip 11.

Such sampling is equivalent to acquiring three images by staggered sampling complying with Shannon's condition, i.e., for example, three images obtained by sampling of the type described in the Applicant's patent application WO 97/05451.

Consequently, with sampling of the kind shown in FIGS. 3 and 4, it is possible to obtain a new image, after interpolation, e.g. by adding together the three above-mentioned images corresponding to staggered sampling or by implementing processing of the type described in greater detail below, which new image is of resolution that corresponds to that obtained with staggered sampling, but has its noise divided by $\sqrt{3}$ compared with the noise of an image as normally obtained with such sampling.

More generally, sampling performed with a strip 11 that is oriented at an angle $\alpha$ relative to the direction D where $\alpha$=arctan($1/n$), where $\underline{n}$ is an integer, and implementing a sampling pitch equal to $p\sqrt{1+n^2}/2$ n in said direction D, is equivalent to acquiring $\underline{n}$ images by means of staggered sampling in compliance with Shannon's condition, and this makes it possible by interpolation to obtain an image whose resolution corresponds to that of such staggered sampling, but in which noise is divided by $\sqrt{n}$.

Figure 5:
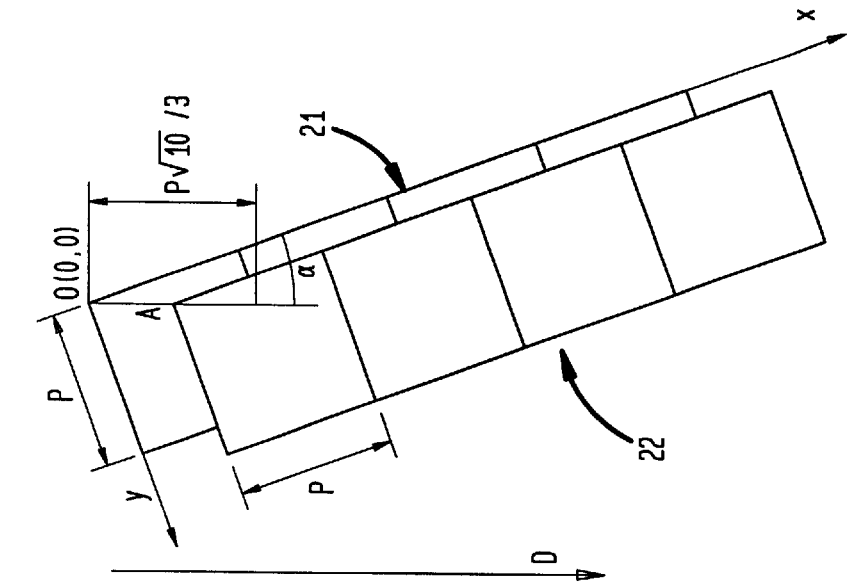
FIG. 5 shows another possible implementation of the invention using two strips of detectors.

Other variant embodiments can naturally be envisaged. In particular, as shown in FIG. 5, it is possible to use two linear strips 21 and 22 in the camera instrument, each having the same pitch $\underline{p}$ between elementary detectors.

The two strips 21 and 22 are oriented at an angle $\alpha$ relative to the direction D where $\alpha$=arctan($1/n$).

They are disposed in the camera instrument in a configuration where they are offset by $p/2$ in the direction in which they extend ($\underline{x}$ direction) and by $p/2n+Kp/n$ in the direction perpendicular thereto ($\underline{y}$ direction), where K is an arbitrary integer that can be adapted to the space available in the focal plane of the instrument.

When the sampling pitch is equal to $\Delta\tau = p\sqrt{n^{2+1}}/n$, then acquisition is performed which is equivalent to acquiring $\underline{n}$ staggered images in compliance with Shannon's condition. Consequently, by interpolating these subimages, it is possible to obtain an image which has the same resolution and whose noise is divided by $\sqrt{n}$ compared with that normally obtained at said resolution.

Similarly, as shown in FIG. 6, the above-described solutions for linear strips can be generalized to matrices having rows that are oriented at an angle $\alpha$ relative to the direction D, where $\alpha$=arctan($1/n$). When only one matrix is used, a sampling pitch in the travel direction is used that is equal to $p\sqrt{1+n^2}/2n$. It is also possible to use two matrices that are offset from each other, with the sampling pitch in the travel direction equal to $p\sqrt{1+n^2}/n$.

Compared with the examples described with reference to FIGS. 3 to 5, which apply to linear strips, images are obtained in which noise is further divided by the square root of the number of rows in the matrix or matrices used.

Whether matrices or strips are used, the interpolation processing can be performed on the ground or on-board.

Performing it on-board has the advantage of enabling the image for transmission to be compressed by a factor of n.

In particular, when the undersampling is of the square type, the interpolated image can be given by:

$$I(n_1, m_1) = \frac{1}{e} \sum_{u,v \in E} I_b(u \cdot p1, v \cdot p2) \text{sinc}\left(\pi\left(\frac{u}{p1} - n_1\right)\right) \text{sinc}\left(\pi\left(\frac{v}{p2} - m_1\right)\right) \quad (2)$$

where E is the oversampled array and $I_b$ is the noisy image obtained with the array;

where $(n_1, m_1)$ is a pair of dummy variables corresponding to the coordinates in the interpolated array; and where p1 and p2 are the elementary sampling pitches in the array E in the direction in which the strip extends and in the direction perpendicular thereto (which implies in particular that they satisfy the equation:

$$p1 \cdot p2/p^2 = e$$

where e is equal to n for all of the cases described with reference to FIGS. 1 to 5).

More generally, for subimages corresponding to arbitrary regular sampling, it is advantageous to implement the following interpolation:

$$I(z) = \frac{1}{e} \sum_{z' \in E} I_b(z') \hat{R}0 (z' - z)$$

where I is the function which corresponds to the interpolated image, $I_b$ is the function which corresponds to the oversampling image;

where z' belongs to the oversampled array E and z belongs to the subarray E0; and where $\hat{R}0$ is the inverse Fourier transform of the function characteristic of RO which is the reciprocal cell of E0.

In a variant, interpolation can consist more simply in adding together the pixels of the sampling subarrays (after interpolating each image so as to make the pixels coincide).

Furthermore, as will have been understood, although the technique described above with reference to FIGS. 3 to 6 enables more flux to be obtained for each pixel, i.e. enables an image to be obtained with less noise, it nevertheless gives rise to a corresponding loss of field.

This loss of swath can be compensated by adding strips in the focal plane.

To this end, as shown in FIG. 7, it is possible to place a row constituted by a plurality of parallel strips 41 in the focal plane where each of the strips is inclined at the same angle α relative to the direction D.

It is also possible, as shown in FIG. 8, to use a plurality of superposed rows of strips 41.

What is claimed is:

1. A method of acquiring and processing a satellite observation image of the earth by means of at least one strip or matrix of detectors of a charge coupled device type, said detectors travelling over an observed zone, in which a plurality of image pixels are initially acquired in a given sampling, the method being characterized in that the array of said sampling includes "e" subarrays corresponding to sampling satisfying Shannon's condition, where "e" is an integer or rational number greater than 1, and in that processing is implemented that enables a noise-reduced image to be interpolated at a resolution corresponding to that of a sampling subarray on the basis of the initially acquired image pixels, and in that the strip or matrix of detectors is oriented relative to the projection of the travel direction of the satellite on a focal plane containing the detectors at an angle α, where α = arctan (1/n) and where n is an integer, and in that the sampling pitch in said travel direction is equal to $p\sqrt{1+n^2}/2n$ where p is the pitch between two elementary detectors of the strip or matrix.

2. A method according to claim 1, characterized in that the image is acquired by means of two strips or matrices oriented at an angle α, where α = arctan (1/n), relative to the projection of the satellite displacement direction on a focal plane, in that the two strips or matrices are offset by p/2 in the direction in which they extend and by p/2n+Kp/n in the direction perpendicular thereto, where K is an integer and where p is the pitch between two elementary detectors in each of said strips, and in that the sampling pitch in the displacement direction is equal to $p\sqrt{1+n^2}/2n$.

3. A method according to claim 1, characterized in that to interpolate the noise-reduced image, the pixels of the sampling subarrays are added together.

4. A method according to claim 1, characterized in that the interpolation processing consists in determining:

$$I(z) = \frac{1}{e} \sum_{z' \in E} I_b(z') \hat{R}0 (z' - z)$$

where I is the function corresponding to the interpolated image, $I_b$ is the function corresponding to an initial image;

where E is the array of the initial image and E0 is the subarray of the interpolated image; and where $\hat{R}0$ is the inverse Fourier transform of the function characteristic of R0 which is the reciprocal cell of E0.

5. A method according to claim 4, characterized in that when the sampling of the subarrays is of the square type, the interpolation processing consists in determining:

$$I(n_1, m_1) = \frac{1}{e} \sum_{u,v \in E} I_b(u \cdot p1, v \cdot p2) \text{sinc}\left(\pi\left(\frac{u}{p1} - n_1\right)\right) \text{sinc}\left(\pi\left(\frac{v}{p2} - m_1\right)\right)$$

where $I_b$ is the function which corresponds to an initially acquired image and E is the array of the initial image;

where $(n_1, m_1,)$ is a pair of dummy variables corresponding to the coordinates in the interpolated array; and where p1 and p2 are the elementary sampling pitches in the array E in the direction in which the strip or matrix extends and in the direction perpendicular thereto.

6. A camera instrument for implementing the method according to claim 1, characterized in that it comprises a strip or matrix of detectors oriented at an angle α = arctan(1/n), where n is an integer, relative to the projection of the satellite travel direction in a focal plane.

7. An instrument according to claim 6, characterized in that it includes at least one row of strips or matrices oriented at an angle α = arctan (1/n) extending in parallel.

8. An instrument according to claim 6, for implementing the method according to claim 3, characterized in that it has two strips oriented at an angle (x, where α = arctan(1/n), relative to the projection of the satellite travel direction in a focal plane, and in that the two strips are offset by p/2 in the direction in which they extend and by p/2n+Kp/n in the direction perpendicular thereto, where K is an integer and where p is the pitch between two elementary detectors in each of said strips.

* * * * *